United States Patent
Lecossais et al.

(10) Patent No.: US 8,943,793 B2
(45) Date of Patent: Feb. 3, 2015

(54) REAR SECTION OF AIRCRAFT NACELLE AND NACELLE EQUIPPED WITH SUCH REAR SECTION

(75) Inventors: Eric Lecossais, Virville (FR); Thierry Ledocte, Le Havre (FR); Pascal Gerard Rouyer, Saint Romain de Colbosc (FR); Felix Carimali, Epouville (FR)

(73) Assignee: Aircelle, Gonfreville l'Orcher (FR)

( * ) Notice: Subject to any disclaimer, the term of this patent is extended or adjusted under 35 U.S.C. 154(b) by 666 days.

(21) Appl. No.: 12/673,288

(22) PCT Filed: Jun. 16, 2008

(86) PCT No.: PCT/FR2008/000835
§ 371 (c)(1),
(2), (4) Date: Feb. 12, 2010

(87) PCT Pub. No.: WO2009/024657
PCT Pub. Date: Feb. 26, 2009

(65) Prior Publication Data
US 2012/0000179 A1    Jan. 5, 2012

(30) Foreign Application Priority Data
Aug. 20, 2007  (FR) .................................... 07 05896

(51) Int. Cl.
*F02K 3/02*    (2006.01)
*B64D 29/00*  (2006.01)

(52) U.S. Cl.
CPC ...................................... *B64D 29/00* (2013.01)
USPC ............ 60/226.1; 60/796; 60/797; 60/226.2; 60/226.3; 60/785; 60/782

(58) Field of Classification Search
USPC ................... 60/226.1, 226.2, 226.3, 782, 785
See application file for complete search history.

(56) References Cited

U.S. PATENT DOCUMENTS

| 4,679,750 | A |   | 7/1987 | Burhans |
| 4,926,633 | A | * | 5/1990 | Nash et al. .................... 60/226.1 |
| 7,216,475 | B2 | * | 5/2007 | Johnson ........................ 60/226.1 |
| 2008/0302083 | A1 | * | 12/2008 | Sloan et al. ................... 60/226.1 |

OTHER PUBLICATIONS

International Search Report PCT/FR2008/000835; Dated Dec. 10, 2008.

* cited by examiner

*Primary Examiner* — Craig Kim
(74) *Attorney, Agent, or Firm* — Brinks Gilson & Lione

(57) ABSTRACT

The invention relates to a rear section (11) of an aircraft nacelle, that comprises two halves (13a, 13b) defining: a central portion (C) for receiving a turbojet engine (7), a cool-air annular passage (31) provided around said central portion (C), and at least one six-hour cavity (15) provided under said central portion (C). The rear section is characterized in that it comprises at least one duct (29a, 29b) for the fluidic communication between said annular passage (31) and said six-hour cavity (15) for maintaining the temperature inside the six-hour cavity (15) within a relatively low range.

6 Claims, 1 Drawing Sheet

REAR SECTION OF AIRCRAFT NACELLE AND NACELLE EQUIPPED WITH SUCH REAR SECTION

TECHNICAL FIELD

The present invention relates to an aircraft nacelle rear section and to a nacelle equipped with such a rear section.

BACKGROUND

The prior art already discloses an aircraft nacelle rear section formed of two halves defining:
 a central part intended to a house a turbojet engine,
 a cold air annular flow path positioned around said central part, and
 at least one six o'clock cavity positioned under said central part.

In such a prior-art device, the six o'clock cavity, the name of which derives from its position on the circular cross section of the section of nacelle (by analogy with the position of the hands on a clock face), is intended to accommodate various ducts and electric cables intended for the operation of the turbojet engine and of the nacelle.

Because of the proximity of the turbojet engine to this six o'clock cavity, the temperatures inside this cavity may reach extremely high values.

This is very troublesome for the components situated inside this cavity, particularly for the electric cables, which when exposed to heat may seriously malfunction or even catch fire.

BRIEF SUMMARY

The disclosure provides an aircraft nacelle rear section formed of two halves defining:
 a central part intended to house a turbojet engine,
 a cold air annular flow path positioned around said central part, and
 at least one six o'clock cavity positioned under said central part,
notable in that it comprises at least one pipe placing said annular flow path in fluidic communication with said six o'clock cavity.

Thanks to the presence of this pipe, cold air can be bled from the cold air annular flow path and conveyed to the six o'clock cavity.

This cold air is able to compensate for the air leaking out of the six o'clock cavity from the inside, and allows this cavity to be raised to a pressure higher than the pressure in the central part in which the turbojet engine is situated.

Because of this higher pressure, the hot air generated by the turbojet engine no longer escapes to the six o'clock cavity, notably through the joint where the two halves of the nacelle rear section meet, as it did in the prior art.

Hence, the temperature inside the six o'clock cavity can be kept within a relatively low range, compatible with the thermal specifications of the various components (pipes, cables) situated inside this cavity.

According to other optional features of this nacelle rear section:
 this section comprises a pipe on each of said halves: this particular arrangement allows a significant amount of cold air to be conveyed into the six o'clock cavity;
 said pipe passes through a panel of the internal structure of this section: this arrangement has the advantage of simplicity because it requires no significant modification to an existing nacelle rear section;
 this section comprises at least one latch connecting said halves and positioned between said central part and said six o'clock cavity: such a latch is needed to play a part in joining the two halves of the section together; because of the raised pressure inside the six o'clock cavity, this latch is no longer subjected to a flow of hot air detrimental to the longevity of the components of which it is made;
 said six o'clock cavity comprises at least one pressure-relief hatch: such a hatch is designed to open if a pipe, particularly a compressed-air pipe, in the six o'clock cavity explodes; because cold air is admitted to this cavity, any air that leaks to the outside around the periphery of this hatch is compensated for;
 said cavity comprises flame arrestors;
 this rear section comprises thrust reversal means;
 said thrust reversal means are of the cascade type.

The present invention also relates to an aircraft nacelle notable in that it comprises a rear section in accordance with the foregoing.

BRIEF DESCRIPTION OF THE DRAWINGS

Other features and advantages of the present invention will become apparent from the description which will follow and from studying the attached figures in which.

DETAILED DESCRIPTION

Figure 1:
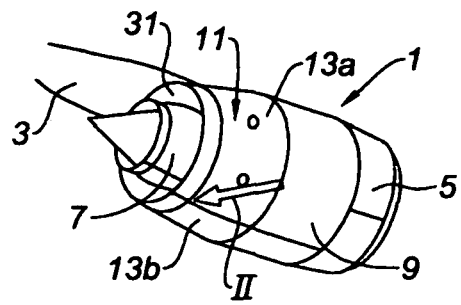
FIG. 1 depicts, in perspective, a nacelle according to the invention equipped with a rear section according to the invention.

Reference is made to FIG. 1 which shows a nacelle 1 according to the invention, fixed to a strut 3 intended to be mounted under a wing of an aircraft (not depicted).

As is known per se, the nacelle 1 comprises a front section 5 able to channel external air toward the turbojet engine 7 situated inside the nacelle 1, an intermediate section 9 surrounding a fan (not visible) and a rear section 11 positioned around the turbojet engine 7.

The rear section 11 is formed of two halves 13a, 13b able to be parted from one another for maintenance operations.

Figure 2:
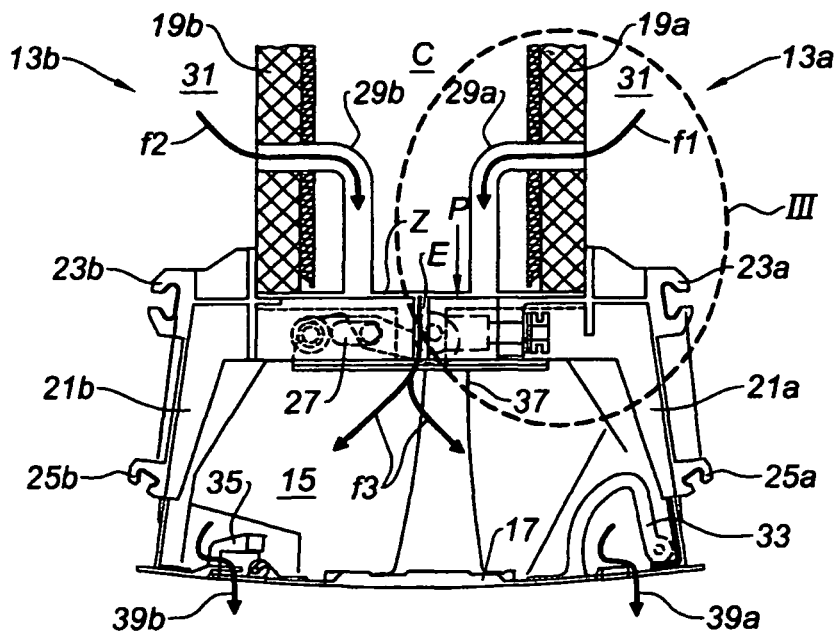
FIG. 2 is a cross section through that region of the nacelle of FIG. 1 that is indicated by arrow II in that figure.

In the lower region where the two halves 13a, 13b meet, as indicated by arrow II, there is a cavity 15 visible in FIG. 2, known as the "six o'clock cavity", closed by a hatch 17.

If reference is now made more particularly to FIG. 2, it will be noticed that each half 13a, 13b of rear section 11 comprises an internal structure panel 19a, 19b fixed to a lower beam 21a, 21b, each lower beam supporting a primary rail 23a, 23b and a secondary rail 25a, 25b which are intended to accommodate a sliding thrust reversal cowling (not depicted).

The halves 13a, 13b of the rear section 11 of the nacelle 1 are joined together notably by a latch 27 the two complementing halves of which are mounted on the beams 21a and 21b respectively.

The space E where the two beams 21a, 21b meet allows an airstream through.

Likewise, the peripheral edges of the hatch 17 collaborate in a not completely airtight manner with fixed parts secured to the beams 21a and 21b respectively.

Pipes 29a and 29b pass respectively through the fixed walls 19a and 19b and each opens, at the one end, into the cold air flow path 31 of the nacelle and, at the other end, into a region Z delimited by a wall P, this region communicating with the space E defined by the two beams 21a, 21b.

The hatch 17 is a pressure-relief hatch, that is to say a hatch able to open if a pipe, particularly a compressed-air pipe, inside the cavity 15 explodes.

This hatch is pivot-mounted on the beam 21a by means of a gooseneck hinge 33, and comprises one or more calibrated latches 35 collaborating with the other beam 21b.

In addition, as is conventional practice, flame arrestors 37 are positioned inside the cavity 15.

The way in which the device according to the invention works and its advantages are directly evident from the foregoing description.

When the turbojet engine 7 is in operation, it releases a very significant amount of heat into the central part C situated between the fixed walls 19a and 19b.

This very significant amount of heat naturally has a tendency to escape through the space E to the cavity 15 and then to the outside, particularly due to the fact that the hatch 17 is not perfectly airtight.

By bleeding cold air from the annular flow path 31 and channeling this cold air to the space E using the pipes 29a, 29b, the cavity 15 can be filled with cold air at a pressure higher than the pressure in the central zone C.

Figure 3:
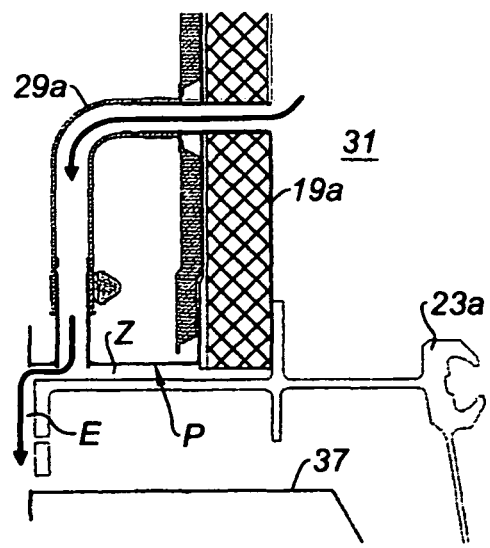
FIG. 3 depicts a larger-scale view of region III of FIG. 2.

This cold air flow is embodied by the arrows f1, f2, f3 visible in FIGS. 2 and 3.

This raised pressure in the cavity 15 can be obtained in spite of a certain loss of cold air to the outside at the periphery of the hatch 17 (see arrows 39a, 39b).

Because the six o'clock cavity 15 is at a raised pressure relative to the central part C, the hot air generated by the turbojet engine 7 encounters a pressure barrier preventing it from migrating toward the cavity 15.

In that way, this cavity 15, together with all the components therein, can be kept at a relative low temperature, avoiding any deterioration of these components.

This is also true of the latch or latches 27 which are exposed to markedly lower temperatures than in the devices of the prior art.

The precepts of the invention may be applied to a nacelle rear section with a cascade-type thrust reverser, as in the case set out hereinabove, but also and more generally to a nacelle rear section equipped with a thrust reverser of the doors type, or even to a nacelle rear section that does not have a thrust reverser.

It will be noted that it might also be possible to provide a number of pipes 29 installed on each half of the nacelle rear section.

The invention is not in any way restricted to the embodiment described and depicted hereinabove, which is given simply by way of example.

Thus, for example, provision could be made for the pipes 29 to have a part extending inside the cold air flow path 31, this part then being equipped with a number of orifices (in the manner of a piccolo tube) for collecting cold air.

The invention claimed is:

1. An aircraft nacelle comprising:
    a front section;
    a middle section surrounding a fan; and
    a rear section formed of two halves, the rear section surrounding a turbojet engine:
    wherein the rear section comprises:
    a central part defined by at least two internal panels, wherein each internal panel is fixed on a corresponding lower beam,
    a cold air annular flow path passing through said at least two internal panels and said central part via a pipe, the two halves each having the pipe;
    at least one cavity at a six o'clock position from a mounting point of the nacelle and an aircraft wing, said cavity positioned under said central part,
    at least one latch connecting said two halves, wherein each latch of the at least one latch is mounted on the corresponding lower beam and is positioned between said central part and said cavity, and
    a space formed by the lower beams wherein said pipe provides a fluidic communication between the cold air annular flow path and the cavity via said space.

2. The rear section as claimed in claim 1, wherein said at least one cavity comprises at least one pressure-relief hatch.

3. The rear section as claimed in claim 1, wherein said at least one cavity comprises flame arrestors.

4. The rear section as claimed in claim 1, further comprising thrust reversal means.

5. The rear section as claimed in claim 4, wherein said thrust reversal means are of a cascade type.

6. An aircraft nacelle, comprising the rear section as claimed in claim 1.

* * * * *